United States Patent
Böjeryd

(10) Patent No.: US 10,206,241 B2
(45) Date of Patent: Feb. 12, 2019

(54) SESSION MANAGEMENT

(71) Applicant: Telia Company AB, Stockholm (SE)

(72) Inventor: Nils Böjeryd, Karlstad (SE)

(73) Assignee: TELIA COMPANY AB, Stockholm (SE)

( * ) Notice: Subject to any disclaimer, the term of this patent is extended or adjusted under 35 U.S.C. 154(b) by 130 days.

(21) Appl. No.: 15/154,008

(22) Filed: May 13, 2016

(65) Prior Publication Data

US 2016/0338135 A1   Nov. 17, 2016

(30) Foreign Application Priority Data

May 13, 2015   (EP) .................................... 15167520

(51) Int. Cl.
  *H04W 76/18*   (2018.01)
  *H04W 76/19*   (2018.01)
  *H04W 48/02*   (2009.01)
  *H04L 29/08*   (2006.01)
  *H04W 8/06*   (2009.01)

(52) U.S. Cl.
  CPC ............ *H04W 76/18* (2018.02); *H04L 67/14* (2013.01); *H04W 48/02* (2013.01); *H04W 76/19* (2018.02); *H04W 8/06* (2013.01)

(58) Field of Classification Search
  CPC . H04W 76/02; H04W 76/025; H04W 76/026; H04W 76/027; H04W 76/10; H04W 76/18; H04W 76/19; H04W 76/30; H04W 76/34; H04W 76/32
  See application file for complete search history.

(56) References Cited

U.S. PATENT DOCUMENTS

| | | | |
|---|---|---|---|
| 2010/0297979 A1* | 11/2010 | Watfa ................ | H04W 8/205 455/404.1 |
| 2012/0178449 A1 | 7/2012 | Liao | |
| 2012/0178457 A1* | 7/2012 | Liao ................ | H04W 76/18 455/437 |
| 2012/0269122 A1* | 10/2012 | Lee ................ | H04W 76/36 370/328 |
| 2015/0055459 A1* | 2/2015 | Wong ................ | H04W 8/04 370/230 |

(Continued)

OTHER PUBLICATIONS

European Search Report EP 15 16 7520 dated Oct. 7, 2015.
(Continued)

*Primary Examiner* — Ashley Shivers
(74) *Attorney, Agent, or Firm* — Young & Thompson

(57) ABSTRACT

The invention relates to a solution for controlling of a mobile terminal to request an establishment of a packet data network connection to a public land mobile network. A method according to the solution comprises: receiving (310), in a network element, a packet data network connection re-quest from the mobile terminal (150); generating (320), by the network element, a response message rejecting the packet data network connection request, wherein the response message comprises information element indicating if the rejection is applicable in at least one other public land mobile network than the one into which the mobile terminal (150) is registered to; and transmitting (330) the generated message to the mobile terminal (150). The invention also relates to a network element and a system implementing at least part of the method.

16 Claims, 5 Drawing Sheets

(56) References Cited

U.S. PATENT DOCUMENTS

| | | | | |
|---|---|---|---|---|
| 2015/0117192 A1* | 4/2015 | Zhang | ................... | H04W 76/10 |
| | | | | 370/230 |
| 2015/0245258 A1* | 8/2015 | Kim | ..................... | H04W 48/18 |
| | | | | 370/331 |
| 2015/0281991 A1* | 10/2015 | Jung | .................... | H04W 24/10 |
| | | | | 370/329 |
| 2015/0373770 A1* | 12/2015 | Niemi | ................. | H04W 76/027 |
| | | | | 370/329 |
| 2016/0330654 A1* | 11/2016 | Jung | .................... | H04W 48/18 |

OTHER PUBLICATIONS

Nokia Networks et al: "Using of list of equivalent PLMNs for UE session management retry", 3GPP Draft, C1-151338, vol. CT WG1, No. Bratislava (Slovakia); Apr. 17, 2015, XP050930195.

Alcatel-Lucent et al: "UE retry handling with optional network signalled timer C1-141311", 3GPP TSG-CT WG1Meeting #86bis, Mar. 21, 2014, XP055218509.

Teliasonera: "Discussion on the applicability of network services amongst equivalent PLMNs", 3GPP DRAFT; C1-142637; vol. CT WG1, No. Cape Town, South Africa; Jul. 14, 2014, XP050777683.

Teliasonera: "Solving ePLMN for ESM/SM Retry—RISE", 3GPP DRAFT; C1-151794, vol. CT WG1, No. Sanya; May 18, 2015, XP050974683.

"3rd Generation Partnership Project; Technical Specification Group Core Network and Terminals; Non-Access-Stratum (NAS) protocol for Evolved Packet System (EPS); Stage 3 (Release 11)", 3GPP Standard; 3GPP TS 24.301; vol. CT WG1, No. V11.14.0, Mar. 20, 2015, pp. 1-348, XP050927890.

* cited by examiner

SESSION MANAGEMENT

TECHNICAL FIELD

The invention concerns in general the technical field of session management in mobile communication network. Especially the invention concerns management of connection establishment.

BACKGROUND

Mobile terminals residing in a mobile network and being served through a circuit switched connection may request a packet data network connection e.g. in a context of requesting access e.g. to Internet or to a private data network. The packet data network connection may be established via a GPRS (General Packet Radio Service) or an EPS (Evolved Packet System) network, which are commonly known implementations for providing packet based data services for subscribers. The GPRS or EPS network may accept the request or reject the request. In case the network rejects the request it is desirable that the mobile refrains from further futile attempts to establish the connection in order to avoid unnecessary utilization of network resources.

The network may, depending on the reason for rejection, force the mobile terminal to back-off further attempts for a network defined time period. To control the mobile terminal's behavior the GPRS or EPS network may add a so called "back-off timer" in the reject message, together with other parameters in the message, e.g. the cause code which indicates the reason why the rejection occurs. In this manner the network may control the utilization of network resources efficiently.

Another aspect to mobile communication is that one or more operators are offering telecommunication services through networks in a certain area. The operator networks, i.e. PLMNs (public land mobile network), are arranged to be identifiable by means of a so called mobile network code (MNC) when used together with a mobile country code (MCC). The MNC is an identifier assigned to a network, and thus for a telecom operator, and which comprises a predetermined number of digits, such as three in Europe. Depending on the network implementation the telecom operator may use only a single mobile network code for the operator network managed by the telecom operator in question or multiple mobile network codes for the operator network, which are managed by the telecom operator in question. The multiple mobile network codes are considered equivalent in view of a mobility functionality of a mobile terminal. The mobility functionality covers at least handover aspects, cell reselection aspects and PLMN selection aspects.

In case a network operator uses multiple mobile network codes, and those mobile network codes are equivalent, the back-off conditions apply only for one mobile network code and packet data network (Access Point name), and not for the other equivalent mobile network codes. The mobile terminals move frequently between cells in the mobile networks, which results in them accessing the mobile operator network using different mobile network codes. It is in some networks desired that the mobile terminals would refrain from resetting the back-off condition when they move between cells where different mobile network codes are used.

For example, imagine a train carrying several hundred mobile terminals into a network cell and out of a network cell in a short time span and wherein the cell and its adjacent cells are configured with different mobile network codes. Unless the back-off condition is maintained during the change between the mobile network codes used in the different cells, all mobile terminals on the train may attempt to establish the futile packet data connections simultaneously. Futile mass connection attempts have a negative impact on user experience and system load, which also impacts users that are not part of the mass attempts.

Hence, there is need for managing attempts to establish a packet data network connection especially in an environment wherein equivalent PLMNs using different mobile network codes are available for a mobile terminal.

SUMMARY

An objective of the invention is to present a method, a network element and a system for controlling a session establishment in a mobile communication network. Another objective of the invention is that the method, the network element and the system enables controlling of a mobile terminal in a context of session establishment.

The objectives of the invention are reached by a method, a network element and a system as defined by the respective independent claims.

According to a first aspect, a method for controlling of a mobile terminal originated request to establish a packet data network connection to a public land mobile network, PLMN, is provided wherein the method comprising: receiving, in a network element, a packet data network connection request from the mobile terminal; generating, by the network element, a response message rejecting the packet data network connection request, wherein the response message comprises information element indicating if the rejection is applicable in at least one other public land mobile network than the one into which the mobile terminal is registered to; transmitting the generated message to the mobile terminal.

The message may further comprise timer information defining a period of time during which the mobile terminal is rejected to re-request the establishment of the packet data network connection. The timer information may comprise a time value to be applied in the PLMN into which the mobile terminal is registered to and in at least one other equivalent PLMN than the one into which the mobile terminal is registered to.

The information element may also comprise information on PLMNs for which the rejection is applicable. The timer information may define individual time value for each PLMN for which the rejection is applicable.

The method may further comprise an initiation of a timer, in the network element, with timer information defining a period of time during which the mobile terminal is rejected to re-request the establishment of the packet data network connection. The timer may be initiated in response to one of the following: transmit of the generated message to the mobile terminal, a receipt of an acknowledgement on the receipt of the generated message from the mobile terminal. Alternatively or in addition, the method may further comprise a generation and transmit of a message to the mobile terminal, the message indicating that the mobile terminal is allowed to re-request the establishment of the packet data network connection.

The information on PLMNs may be Mobile Network Code.

According to a second aspect, a network element for controlling of a mobile terminal originated request to establish a packet data network connection to a public land mobile network, PLMN, is provided, wherein the network element comprising: at least one processor, and at least one memory storing at least one portion of computer program code; wherein the processor being configured to cause the network element at least to perform: receive a packet data network connection request from the mobile terminal; generate a response message rejecting the packet data network connection request, wherein the response message comprises information element indicating if the rejection is applicable in at least one other public land mobile network than the one into which the mobile terminal is registered to; transmit the generated message to the mobile terminal.

The network element may be configured to embed timer information in the information element, the timer information defining a period of time during which the mobile terminal is rejected to re-request the establishment of the packet data network connection. The timer information may comprise a time value to be applied in the PLMN into which the mobile terminal is registered to and in at least one other equivalent PLMN than the one into which the mobile terminal is registered to.

The network element may be configured to embed information on PLMNs for which the rejection is applicable in the information element. The network element may be configured to define individual time value for each PLMN for which the rejection is applicable.

The network element may comprise a timer, which is configured to be initiated with timer information defining a period of time during which the mobile terminal is rejected to re-request the establishment of the packet data network connection. The timer may be configured to be initiated in response to one of the following: transmit of the generated message to the mobile terminal, a receipt of an acknowledgement on the receipt of the generated message from the mobile terminal. Alternatively or in addition, the network element may further be configured to generate and transmit a message to the mobile terminal, the message indicating that the mobile terminal is allowed to re-request the establishment of the packet data network connection.

The information on PLMNs may be Mobile Network Code.

According to a third aspect, a system for controlling of a mobile terminal originated request to establish a packet data network connection to a public land mobile network, PLMN, is provided wherein the system comprising: two or more equivalent public land mobile networks, and at least one network element controlling the public land mobile networks, wherein the system: receiving, in the at least one network element, a packet data network connection request from a mobile terminal; generating, by the network element, a response message rejecting the packet data network connection request, wherein the response message comprises information element indicating if the rejection is applicable in at least one other public land mobile network than the one into which the mobile terminal is registered to; and transmitting the generated message to the mobile terminal.

The exemplary embodiments of the invention presented in this patent application are not to be interpreted to pose limitations to the applicability of the appended claims. The verb "to comprise" is used in this patent application as an open limitation that does not exclude the existence of also un-recited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objectives and advantages thereof, will be best understood from the following description of specific embodiments when read in connection with the accompanying drawings.

BRIEF DESCRIPTION OF FIGURES

The embodiments of the invention are illustrated by way of example, and not by way of limitation, in the FIGS. of the accompanying drawings.

FIG. 1 illustrates schematically an example of an environment where the present invention may be implemented and applied to.

DESCRIPTION OF SOME EMBODIMENTS

Figure 1:
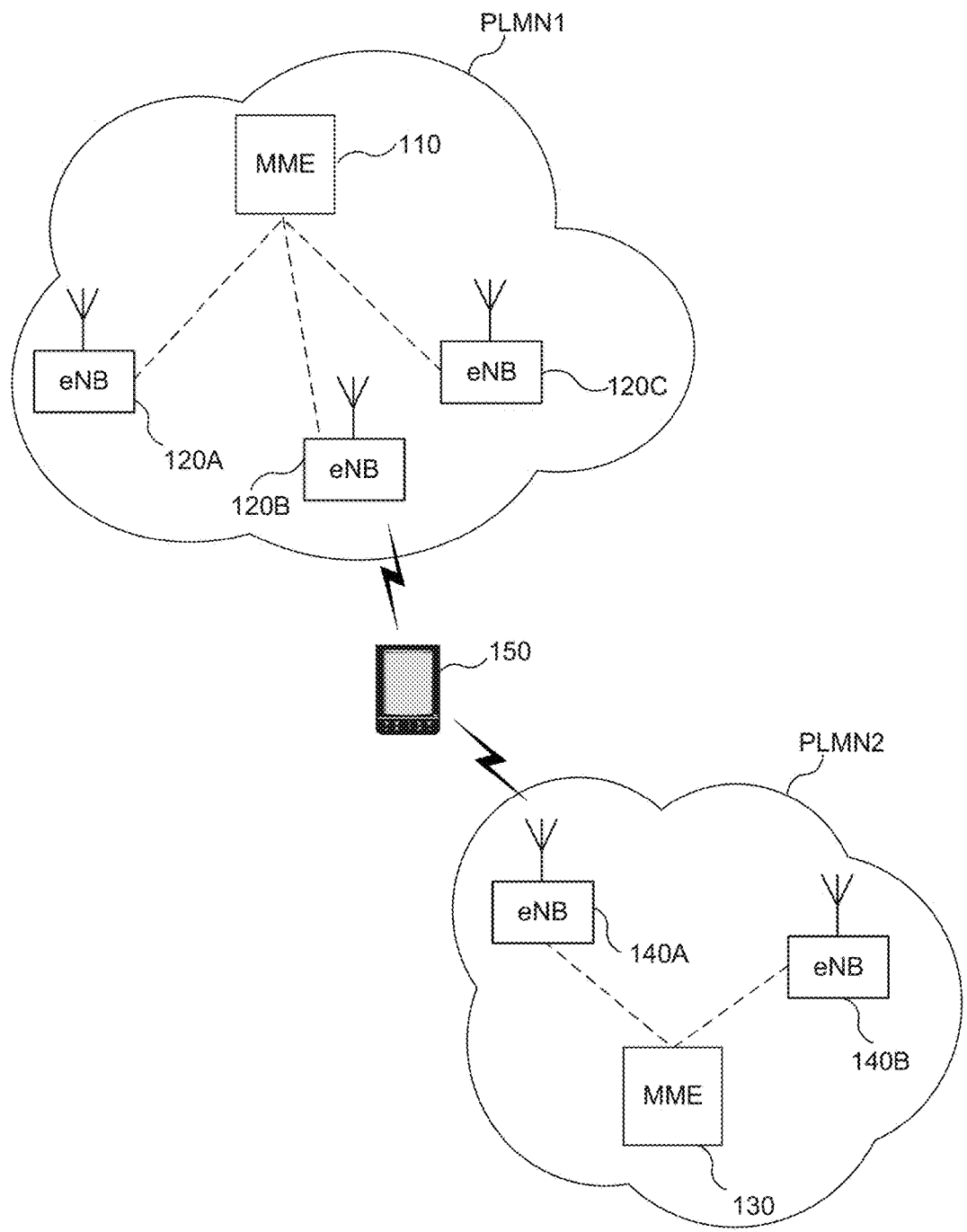

FIG. 1 discloses an example of an environment where the present invention may be implemented and applied to. The environment comprises two or more public land mobile networks PLMN1, PLMN2, which may be overlapping fully, in part or not at all. Each PLMN consists of known network elements in order to provide telecommunication services for mobile terminals 150. The PLMNs as illustrated in the FIG. 1 comprise Mobility Management Entities (MME) 110, 130 in the core network side and base stations (eNB) 120A, 120B, 120C and 140A, 140B in the radio network side. The MME is the network node controlling the operation of the mobile communication network and managing the security aspects at least partly in the network among other things. Each PLMN may be implemented with the same or different network technology especially as it comes to the radio access technology.

Let us now assume that the PLMN1 and PLMN2 belong to the same telecom operator and the PLMNs are considered to be equivalent. The mobile terminal 150 is registered to the PLMN1 and attempts to establish a packet data network connection in the PLMN1, e.g. via GPRS or EPS technology according to the technical implementation of the PLMN1. The request is received in the MME 110, which, for some reason, needs to reject the request. The reason may e.g. originate from the subscription itself (e.g. that the subscription requesting the packet data connection is not allowed to access to the packet data network in question) or from network related issues (e.g. temporary network overload or transmission failures). According to the present invention the MME 110 is configured to indicate to the mobile terminal 150 that the rejection of the packet data network connection to the PLMN1 into which the mobile terminal 150 is registered to applies also to at least one other PLMN accessible to the mobile terminal 150, such as PLMN2 in FIG. 1 e.g. in case of the mobile terminal roams to the service area of the PLMN2. The indication may be implemented by delivering necessary information in the rejection message to the mobile terminal 150.

Figure 2A:
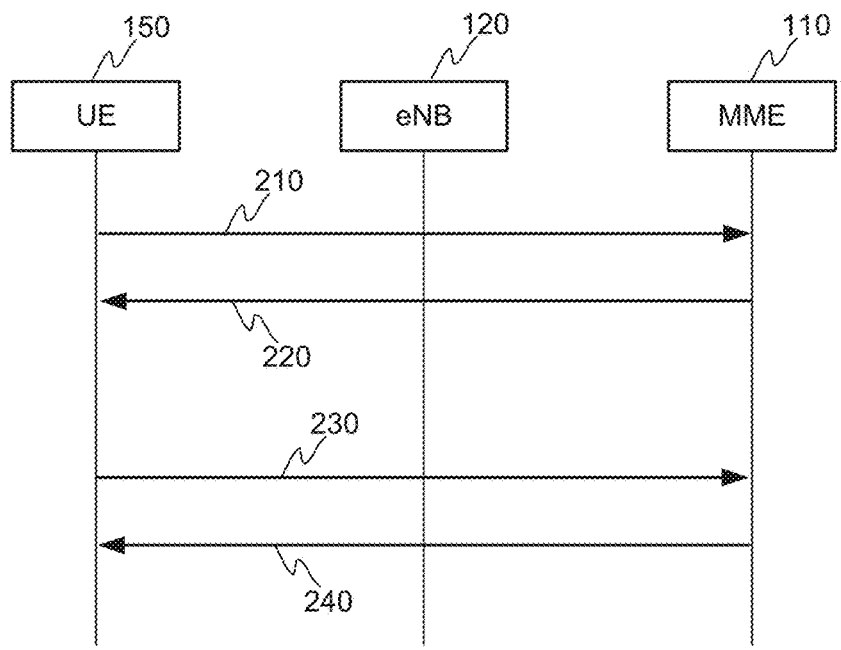
FIG. 2A illustrates schematically an example of a first embodiment of the invention.
Figure 2B:
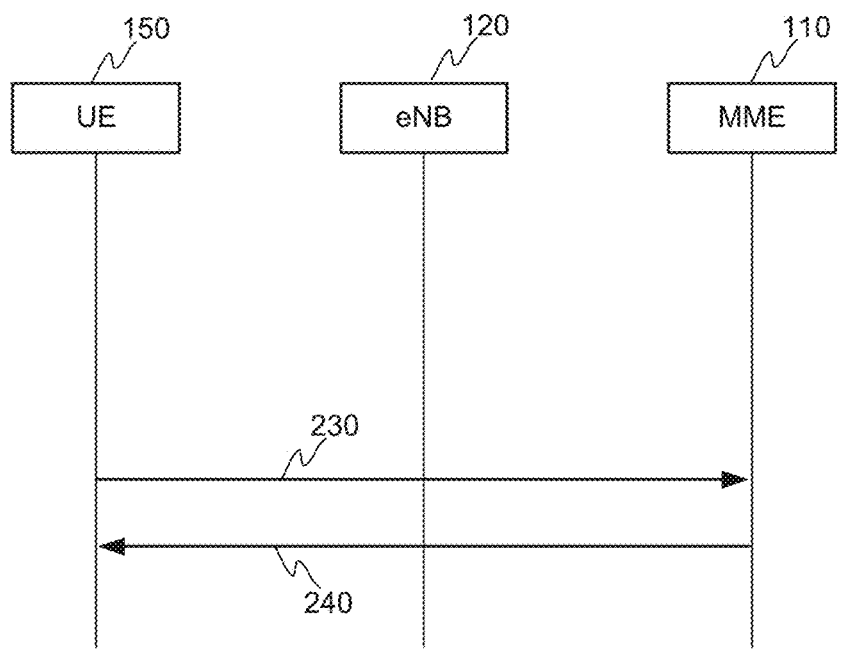
FIG. 2B illustrates schematically an example of a second embodiment of the invention.

An aspect of the invention relates to an implementation of the indication, which is now discussed in more detail by referring to the FIGS. 2A and 2B. According to a first embodiment of the invention the indication may be implemented by arranging information element in the rejection message, which rejection message 240 is arranged to be delivered in response to a request of a packet data network connection 230 if necessary. The information element is configured to carry information that the rejection shall also apply in other PLMNs than the one into which the mobile terminal is registered to. Additionally, the information element may be configured to carry information that the rejection does not apply in any other equivalent PLMN but the one into which the mobile terminal is registered to. The information in the information element may comprise a necessary amount of data items, such as one or more bits, in order to deliver the indication.

The implementation according to the first embodiment of the invention, as depicted in FIG. 2A, is based on a typical operation of the mobile communication network wherein a registration procedure, such as location registration, is performed to the mobile terminal 150. The registration procedure allows the mobile terminal to inform the network on its location 210 and it is performed periodically if the mobile terminal 150 remains in the same area and every time when the mobile terminal enters to a new registration area. In a context of the registration procedure the network, i.e. PLMN, is configured to transmit 220 so called equivalent PLMN (ePLMN) list to the mobile terminal 150. The equivalent PLMN list comprises mobile network codes (MNC) on the PLMNs, which are equivalent with respect to each other. Due to the registration procedure the mobile terminal 150 has always received the ePLMN list before requesting the packet data network connection. Hence, in the implementation according to the first embodiment of the invention the rejection of a packet data network connection in multiple equivalent PLMNs may be arranged with only one information element delivered from the network, i.e. from e.g. MME, to the mobile terminal 150. The term "registration procedure" refers to, but is not limited to, tracking area update operation or routing area update operation, for example.

According to a second embodiment of the invention, as depicted in FIG. 2b, the mobile terminal 150 may transmit a request of packet data network connection 230 to a network element, such as MME 110. The network element is configured to decide on a basis of predetermined parameters if the packet data network connection is allowable or not. In case of negative decision a rejection message is generated and transmitted 240 to the mobile terminal 150. The rejection message comprises the indication carrying the information if the rejection shall apply in any other equivalent PLMN but the one into which the mobile terminal is registered to or not is arranged to comprise also information on the PLMNs for which the rejection applies to. For example, the information element in the rejection message may be a table listing only those PLMNs (e.g. MNC) to whom the rejection applies. Alternatively it may be a full ePLMN list e.g. in a table form. In the list each PLMN may be provided with a value, such as a bit with value '1' or '0', indicating if the rejection shall apply or not to the PLMN in question.

The rejection message may comprise, in addition to the indication if the rejection of the packet data connection request is applicable in at least one other PLMN, information on a period of time how long the rejection applies. In the implementation according to the first embodiment discussed above the period of time may be directly applied to all equivalent PLMNs. The implementation according to the second embodiment as discussed above provides a possibility to define different periods of time for the equivalent PLMNs. This may be achieved by adding a data item for each PLMN in the information element which data item defines the period of time the PLMN in question is rejected. The advantage of such an implementation is that it enables managing the rejections individually per PLMN so that predetermined parameters may be taken into account in determination of the period of time for the rejection. For example, it is possible to arrange so that a value for each timer of a PLMN is determined based on a cause code disclosing the reason for rejection. The cause code may be related to subscription issues (e.g. limitation in what a user is allowed to do) or network issues (temporary network overload, or transmission failures) for example, and hence it is advantageous to take the cause code into account in the determination of the timer value.

Summarizing above the both embodiments of the invention as described are based on the same inventive idea in which the network element is configured to decide and deliver an indication if the rejection is also applicable for other equivalent PLMNs than the one into which the mobile terminal 150 is registered to. The information carried in the rejection message 240 differs between the described embodiments.

Next the invention is described from the mobile terminal 150 point of view when the mobile terminal 150 receives the rejection message 240. In case the mobile terminal 150 has received the ePLMN list prior to the receipt of the rejection message 240 the mobile terminal 150 is configured to determine from the content of the rejection message if it comprises indication if the rejection is applicable with at least one other equivalent PLMN or not. If the rejection applies to at least one other PLMN than the one the mobile terminal 150 is registered to the mobile terminal 150 may be configured to initiate a back-off timer which is applicable to all equivalent PLMNs. The running time of the timer may be defined in multiple ways. The first option may be such that the running time is defined in the mobile terminal e.g. through stored information in a SIM card or in a mobile terminal and its use is initiated in response to the receipt of the rejection message. A second option may be that the network delivers in some communication, such as during the location update procedure, a value for the timer, which is to be applied in the context of the rejection of the packet data network connection in the timer implemented in the mobile terminal 150 or in the SIM card. The value for the timer may be directly a time value or any other value from which the input parameter for the timer may be derived. If the rejection message comprises a list of equivalent PLMNs for which the rejection applies to and individual running time values for the respective ePLMNs the mobile terminal 150 may be configured to initiate a corresponding number of timers for each of the PLMNs to be rejected. The mobile terminal 150 is allowed to re-attempt an establishment of the packet data network connection when the timer has run out.

Above it is indicated that the timer may be implemented either in the mobile terminal or in the SIM card. A third alternative is that the timer is implemented in the network side. In such a case the present invention may be implemented so that the network element, and thus the network, in the rejection situation is configured to inform the mobile terminal that the packet data network connection is rejected and the rejection applies at least one other network than the one the mobile terminal is registered to. The indication may be implemented in the same manner as described above i.e. with some sort of predetermined information element. However, the network does not deliver any value for a timer in the mobile terminal if such is implemented. In this case the network element may be configured to initiate a timer in the network side, e.g. in the network element itself, with a predetermined value. The initiation of the timer in the network may be triggered to the delivery of the rejection message or to an acknowledgement received in the network element from the mobile terminal acknowledging that the delivery of the rejection message was successful. When the timer runs out, i.e. the rejection period of time is over, the network element may be configured to generate and deliver a message to the mobile terminal indicating that the mobile terminal may re-attempt to request packet data network connection from one or more PLMNs rejected earlier.

The value for the timer(s) may vary from a second to 14 days according to the specification, but these are not limited anyhow from technical point of view. An example of a typical value that is used in rejections is 12 minutes. The timer may be implemented with a hardware or software solution in at least one of the mentioned locations. In order to adjust the input value for the timer an internal clock signal may be arranged as a reference signal for the timer.

Figure 3:
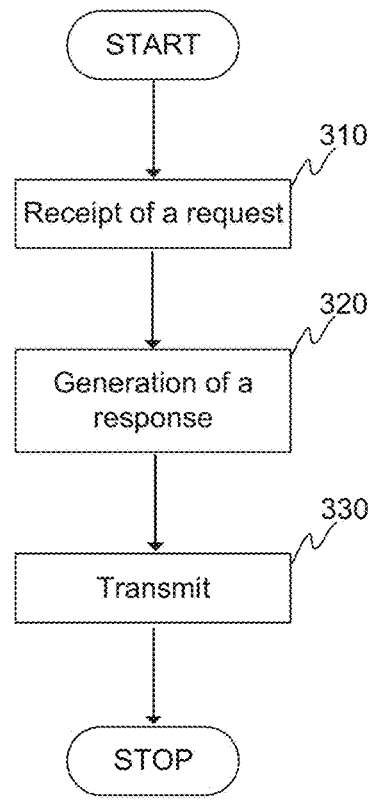
FIG. 3 illustrates schematically an example of method according to the invention.

FIG. 3 illustrates schematically the method according to the invention from the network element point of view. The method is initiated in step 310 wherein the network element receives a request for packet data network connection. In response to the receipt of the request the network element may need to reject the request for some reason. In such a situation the network element is configured to generate 320 a response message rejecting the packet data network connection request to the mobile terminal, wherein the response message comprises information element indicating if the rejection is applicable in at least one other public land mobile network than the one into which the mobile terminal is registered to. The network element is configured to transmit the generated message to the mobile terminal in step 330 of the method.

Figure 4A:
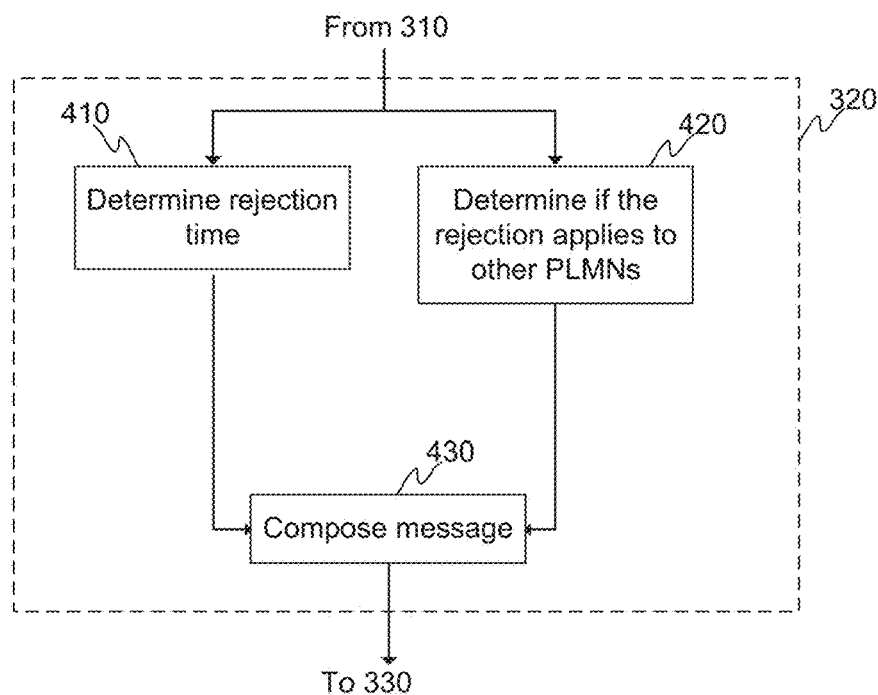
FIG. 4A illustrates schematically an example of a method step according to the invention.

FIG. 4A illustrates schematically the step 320 in more detail when a mobile terminal 150 is aware of equivalent PLMNs in the network or in a certain location in the network. The awareness may e.g. be achieved through a delivery of ePLMN list to the mobile terminal 150. In response to a request of packet data network connection a network element determines a rejection time 410 (it is assumed that a decision of the rejection is made under predetermined rules). Additionally, the network element decided is the rejection shall be applied to other equivalent PLMNs than the one into which the mobile terminal is registered to. This may be indicated in a predetermined manner, as previously discussed. The steps 410 and 420 are illustrated in FIG. 4A to be performed concurrently, but it is possible that they are successive operations in the method. In response to the determination of the rejection time 410 and if the rejection applies to the other ePLMNs, if any, the rejection message is composed 430.

Figure 4B:
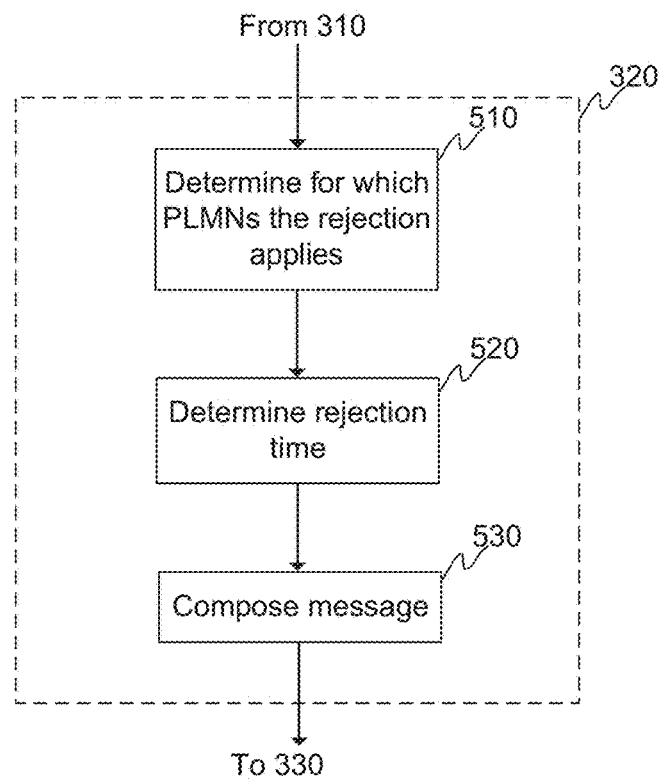
FIG. 4B illustrates schematically another example of a method step according to the invention.

FIG. 4B illustrates schematically the step 320 in more detail when information defining the equivalent PLMNs for which the rejection applies to is delivered in a rejection message. Here it is also assumed that a decision of the rejection is already made under predetermined rules. In a first phase a network element is configured to determine 510 for which equivalent PLMNs the rejection shall apply to. The determination may e.g. be performed by inquiring information from data storage, such as from a register accessible by the network element. In response to the inquiry the network element may receive the necessary information on the equivalent PLMNs either at the time of inquiry or in general. Next, the network element, such as MME, is configured to determine 520 the time how long the rejection shall be maintained. Depending on the implementation of the invention the time may be determined to be common for all the determined equivalent PLMNs or it may be determined individually for each equivalent PLMNs. The value for timers may be stored, but is not limited to, in MME as a list for example. The rejection time may e.g. be defined in a context of each PLMN information stored in data storage in the network or it may be determined case by case. For example, in some implementation of the invention the length of the rejection time may be dependent on a cause of rejection. Finally, the rejection message is composed 530 so that the parameters, such as PLMN information and rejection time, are included, among other data items, in the rejection message.

Figure 5:
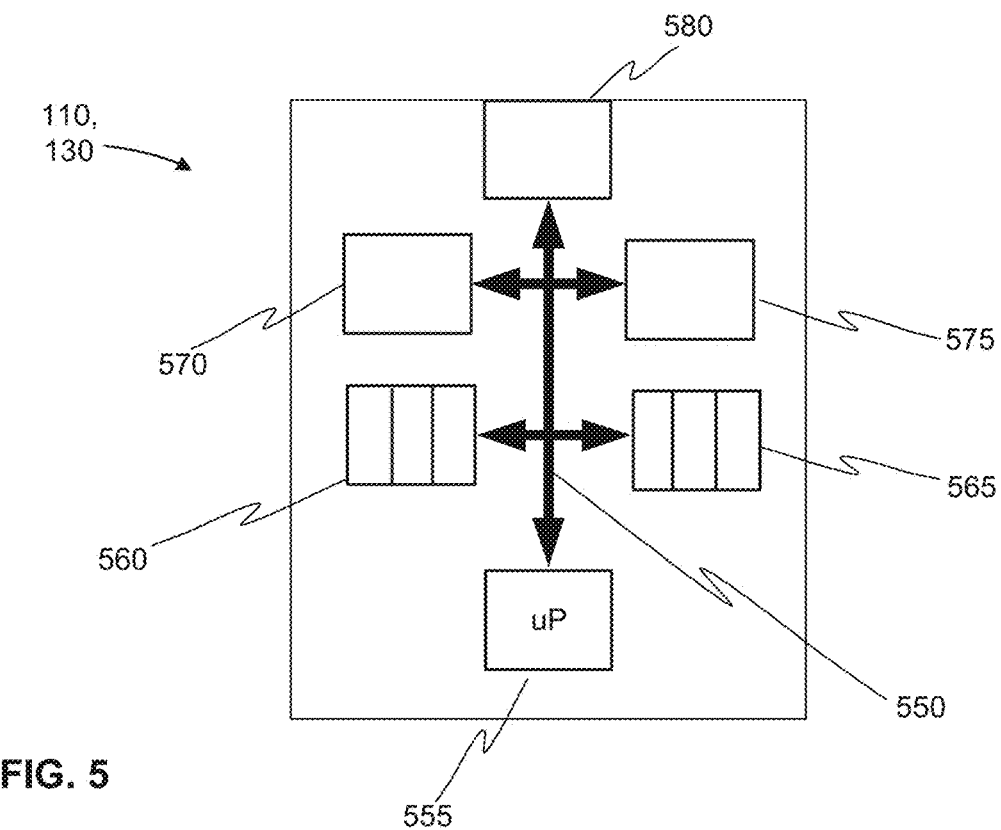
FIG. 5 illustrates schematically an example of the network element according to the invention.

FIG. 5 illustrates schematically an example of a network element, such as MME, according to an implementation consistent with the principles of the invention. The network element may comprise a bus 550, a processor 555, a random access memory (RAM) 560, a read only memory (ROM) 565, input means 570, output means 575, and a communication interface 580. The bus 510 may include means or methods that enable communication among the internal elements of the network element.

The processor 555 may comprise one or more conventional processors, one or more microprocessors, or one or more processing logics, or any combination of these, that interprets and executes instructions defined by portions of computer program code. The random access memory 560 may store information and instructions for execution by the processor 555. The ROM 565 may include a conventional ROM device or another type of a static storage device that is configured to store static information and instructions for use by the processor 555. The RAM and ROM may be implemented with one or more corresponding memory elements.

The input means 570 may comprise a conventional mechanism that permits a user to input information to the network element, such as a keyboard, a mouse, a pen, a touch screen, voice recognition and/or biometric mechanisms, etc. The output means 575 may comprise a conventional mechanism that outputs information to the user, including a display, a printer, a speaker, etc. The communication interface 580 enables the network element to communicate with other nodes and/or systems within a network. For example, the communication interface 580 may comprise mechanisms for communicating with external entities such as networks and network elements, such as databases and registers as non-limiting examples.

The network element may perform the operations as described above in response to the processor 555 executing at least one portion of instructions defined in portions of computer program code contained in the computer-readable medium, such as memory. A computer-readable medium may be defined as a physical or logical memory device. The software instructions may be read into the memory from another computer-readable medium, such as a data storage device, or from another device via the communication interface 580. The software instructions may cause the processor 555 to perform method steps and processes as described.

Figure 6:
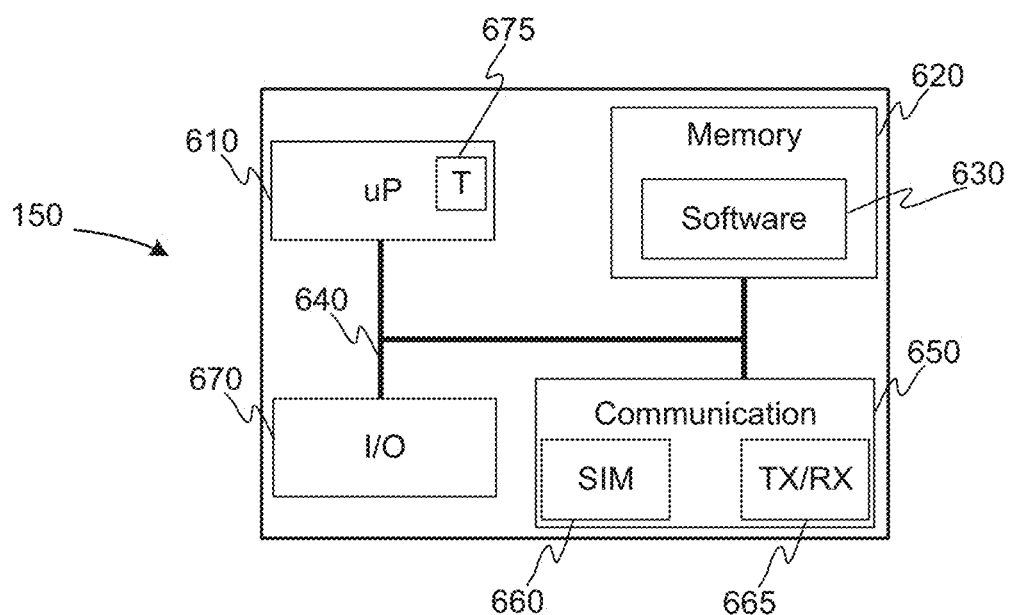
FIG. 6 illustrates schematically an example of the mobile terminal according to the invention.

FIG. 6 illustrates a mobile terminal 150 according to an embodiment of the invention. The mobile terminal 150 may comprise a bus 640 that couples one or more processors 610, memory 620 including portions of computer program code 630 that e.g. may comprise device application and functionalities, input/output (I/O) devices 670, a communication interface 650 comprising subscriber identity module 660 and transmit/receive TX/RX unit 665. The I/O devices 670 refers to any necessary input/output units by means of which it is possible to input and output data to and from the mobile terminal. The I/O devices 670 may also comprise elements specific to the mobile terminal 115 in order to operate e.g. in the network in question. Such element may e.g. be applicable sensors, for example. The communication interface 650 comprises network adapters and antennas, which are necessary to implement the communication of the mobile terminal 150 as described herein. The subscriber identity module (SIM) 660 may be embedded in the communication interface 650 in order to provide access to the mobile communication network. The mobile terminal may comprise some additional elements, such as power source, which are not disclosed in FIG. 6 for clarity reasons. Furthermore, a timer 675 according relating to the present invention is illustrated in the FIG. 6. The timer is executed by the processor 610 in response to a receipt a rejection message from the network element. The rejection message may carry the timer value or it may be stored in a memory 620 of the mobile device, which is timer value is given as an input parameter to the timer 675. The timer may also be implemented in the SIM card, as discussed earlier. Moreover, similar timers may be implemented multiple if the rejection time is determined individually for multiple PLMNs.

The invention also relates to a telecommunication system. An example of the telecommunication system according to the present invention comprises two or more equivalent PLMNs and at least one network element, such as MME, controlling the PLMNs. Furthermore, the telecommunication system comprises at least one mobile terminal equipped with necessary subscriber information enabling the mobile terminal to access the at least two PLMNs when the mobile terminal is residing within a service area of at least one of the two PLMNs. The mobile terminal may request packet data network connection in the PLMN from the network element into which the mobile terminal is registered to. The network element may reject the request for some reason. In response to the decision that the request shall be rejected, the network element may be configured to generate a response message rejecting the packet data network connection request, wherein the response message comprises information element indicating if the rejection is applicable in at least one other PLMN than the one into which the mobile terminal is registered to. Finally, the generated message is transmitted to the mobile terminal. The telecommunication system may be implemented so that the network element may also determine timer information, i.e. time value, to be embedded in the information element which defines a period of time how long the mobile terminal is not allowed to re-request the packet data network connection from the PLMNs. According to the examples of the invention the timer may be initiated either in the mobile terminal or in a SIM card residing in the mobile terminal or in a network element. In some implementation of the invention the telecommunication system is configured to deliver either periodically or in response to some predetermined operation a list of equivalent PLMNs to the mobile terminal. In some implementation of the system the rejection message blocks the mobile terminal to request packet data network connection in any of the PLMNs disclosed in the list during the running time of the timer. In some other implementation of the system the rejection message is configured to carry information to the mobile terminal on PLMNs which are rejected for packet data network connection during the mentioned running time of the timer. It may also be arranged so that the network element defines an individual rejection time for each of the PLMNs and the individual rejection time is added in the rejection message. All in all, the telecommunication system may be configured to implement all aspects of the method according to the invention as described earlier.

Even if in the description it is mainly referred that the network element configured to control the establishment of the packet data network connection is MME it may also be any other which is configured to perform corresponding tasks with the MME. For example, mobile switching centre (MSC) in the context of general packet radio service (GPRS) may be arranged to perform the method according to the present invention.

Further, the term information element in the message shall be understood broadly in this context. It may be a specific character or value by means of which it is possible to indicate that the rejection shall also be applied in other equivalent PLMNs but the one the mobile terminal is registered to. On the other hand the information element may simply comprise a list of PLMNs for which the rejection applies. In such a case, for example, the structure of the message may indicate that the rejection is to be applied in all equivalent PLMNs listed in the message.

Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

The invention claimed is:

1. A method for controlling of a mobile terminal originated request to establish a packet data network connection to a public land mobile network, PLMN, the method comprising:

receiving, in a network element, a packet data network connection request from the mobile terminal, generating, by the network element, a response message to the mobile terminal rejecting the packet data network connection request, wherein the generated response message comprises information element comprising information on PLMNs for which the rejection is applicable and timer information defining individual timer value for the PLMNs, the individual timer value defining a period of time the mobile terminal is rejected to re-request the establishment of the packet data network connection from the PLMN in question, transmitting the generated response message to the mobile terminal, and initiation of a timer, in the network element, with the timer information defining the period of time during which the mobile terminal is rejected to re-request the establishment of the packet data network connection.

2. The method of claim 1, wherein the timer is initiated in response to a receipt of an acknowledgement on the receipt of the generated response message from the mobile terminal.

3. The method of claim 2, wherein the method further comprising a generation and transmit of a further message to the mobile terminal, the further message indicating that the mobile terminal is allowed to re-request the establishment of the packet data network connection.

4. The method of claim 1, wherein the information on PLMNs is Mobile Network Code.

5. The method of claim 1, wherein the method further comprising a generation and transmit of a further message to the mobile terminal, the further message indicating that the mobile terminal is allowed to re-request the establishment of the packet data network connection.

6. The method of claim 1, wherein the network element is a Mobility Management Entity (MME) arranged as a network node controlling operation of the public land mobile network.

7. The method of claim 1, wherein the timer is initiated in response to transmit of the generated response message to the mobile terminal.

8. A network element for controlling of a mobile terminal originated request to establish a packet data network connection to a public land mobile network, PLMN, the network element comprising:
- at least one processor,
- at least one memory storing at least one portion of computer program code, and
- a timer, which is configured to be initiated with timer information defining a period of time during which the mobile terminal is rejected to re-request the establishment of the packet data network connection,
- wherein the processor being configured to cause the network element at least to perform:
- receive a packet data network connection request from the mobile terminal,
- generate a response message to the mobile terminal rejecting the packet data network connection request, wherein the generated response message comprises information element comprising information on PLMNs for which the rejection is applicable and the timer information defining individual timer value for each of the PLMNs, the individual time value defining the period of time the mobile terminal is rejected to re-request the establishment of the packet data network connection from PLMN in question, and
- transmit the generated response message to the mobile terminal.

9. The network element of claim 8, wherein the timer is configured to be initiated in response to a receipt of an acknowledgement on the receipt of the generated response message from the mobile terminal.

10. The network element of e claim 9, wherein the network element is further configured to generate and transmit a further message to the mobile terminal, the further message indicating that the mobile terminal is allowed to re-request the establishment of the packet data network connection.

11. The network element of claim 8, wherein the information on PLMNs is Mobile Network Code.

12. The network element of claim 8, wherein the network element is further configured to generate and transmit a further message to the mobile terminal, the further message indicating that the mobile terminal is allowed to re-request the establishment of the packet data network connection.

13. The network element of claim 8, wherein the network element is a Mobility Management Entity (MME) arranged as a network node controlling operation of the public land mobile network.

14. The network element of claim 8, wherein the timer is configured to be initiated in response transmit of the generated response message to the mobile terminal.

15. A system for controlling of a mobile terminal originated request to establish a packet data network connection to a public land mobile network, PLMN, the system comprising:
- two or more equivalent public land mobile networks, and
- at least one network element controlling the public land mobile networks, wherein the system:
- receiving, in the at least one network element, a packet data network connection request from a mobile terminal,
- generating, by the network element, a response message to the mobile terminal rejecting the packet data network connection request,
- wherein the generated response message comprises information element comprising information on PLMNs for which the rejection is applicable and timer information defining individual timer value for the PLMNs, the individual timer value defining a period of time the mobile terminal is rejected to re-request the establishment of the packet data network connection from the PLMN in question,
- transmitting the generated response message to the mobile terminal, and
- initiation of a timer, in the network element, with the timer information defining the period of time during which the mobile terminal is rejected to re-request the establishment of the packet data network connection.

16. The system of claim 15, wherein the network element is a Mobility Management Entity (MME) arranged as a network node controlling operation of the public land mobile network.

* * * * *